United States Patent
Kornelsen

(10) Patent No.: US 6,629,820 B2
(45) Date of Patent: Oct. 7, 2003

(54) MICROFLUIDIC FLOW CONTROL DEVICE

(75) Inventor: Kevin E. Kornelsen, Edmonton (CA)

(73) Assignee: Micralyne Inc., Edmonton (CA)

( * ) Notice: Subject to any disclaimer, the term of this patent is extended or adjusted under 35 U.S.C. 154(b) by 0 days.

(21) Appl. No.: 09/888,648

(22) Filed: Jun. 26, 2001

(65) Prior Publication Data

US 2002/0197167 A1 Dec. 26, 2002

(51) Int. Cl.⁷ ............................................... F04B 43/14
(52) U.S. Cl. ........................ 417/53; 417/507; 251/331; 251/368; 137/833
(58) Field of Search ................................ 417/53, 413.2, 417/413.3, 372, 507, 508, 415, 322, 479; 210/322, 323.1, 323.6, 320, 321.6, 323; 251/318, 319, 331, 368; 137/833

(56) References Cited

U.S. PATENT DOCUMENTS

| | | | |
|---|---|---|---|
| 5,058,856 A | * 10/1991 | Gordon et al. | 251/11 |
| 5,085,562 A | * 2/1992 | van Lintel | 417/413 |
| 5,094,594 A | * 3/1992 | Brennan | 417/322 |
| 5,333,831 A | * 8/1994 | Barth et al. | 251/11 |
| 5,997,263 A | * 12/1999 | van Lintel et al. | 417/413.2 |
| 6,033,191 A | * 3/2000 | Kamper et al. | 417/322 |
| 6,048,734 A | 4/2000 | Burns et al. | 436/180 |
| 6,056,269 A | 5/2000 | Johnson et al. | 251/331 |
| 6,068,751 A | * 5/2000 | Neukermans | 204/601 |
| 6,143,248 A | 11/2000 | Kellogg et al. | 422/72 |
| 6,146,103 A | * 11/2000 | Lee et al. | 417/322 |
| 6,261,066 B1 | * 7/2001 | Linnemann et al. | 417/53 |
| 6,309,189 B1 | * 10/2001 | Rey-Mermet et al. | 417/413.3 |

OTHER PUBLICATIONS

Kazuo Hosokawa, Teruo Fujii, and Isao Endo, "Hydrophobic microcapillary vent for pneumatic manipulation of liquid in μTAS", p. 307–310, Technical Digest, Transducers '99, Jun., 1999.

S.E. McBride, R.M. Moroney, W. Chiang, "Electrohydrodynamic pumps for high–density microfluidic arrays", p. 45–48, Technical Digest, μTAS 1998, Oct., 1998.

A.V. Lemoff, A.P. Lee, R.R. Miles, C.F. McConaghy, "An AC magnetohydrodynamic micro–pump: towards a true integrated microfluidic system", p. 1126–1129, Technical Digest, Transducers '99, Jun., 1999.

P.H. Paul, D.W. Arnold, and D.J. Rakestraw, "Electrokinetic generation of high pressures using porous microstructures", p. 49–52, Technical Digest, Transducers '99, Jun., 1999.

M.W. Prins, W.J.J. Welters, J.W. Weekamp, "Fluid control in multichannel structures by electrocapillary pressure", Science, p. 277, Jan. 12, 2001.

* cited by examiner

Primary Examiner—Charles G. Freay
Assistant Examiner—Han L Liu
(74) Attorney, Agent, or Firm—Anthony R. Lambert

(57) ABSTRACT

A method of controlling fluid flow in a channel in a microfluidic flow control device by introducing fluid to the channel, with the fluid flowing in a flow direction and controllably deforming material defining the channel in a direction perpendicular to the flow direction to control fluid flow in the channel. The channel is formed between a first plate and a second plate and controllably deforming material defining the channel comprises deforming at least one of the first and second plates. Material defining the channel extends continuously between an inlet port and an outlet port. Controllably deforming material defining the channel preferably comprises deforming the first plate into contact with a seat formed in the second plate to close the channel. The seat may be formed by a ridge having a smoothly changing profile in section across the channel. The method may be operated to generate a pumping, filtering, trapping or mixing function. Apparatus for carrying out the method is also disclosed.

14 Claims, 17 Drawing Sheets

MICROFLUIDIC FLOW CONTROL DEVICE

BACKGROUND OF THE INVENTION

This invention relates to the design and use of microfluidic devices, particularly microfluidic valves, pumps and mixers.

Microfluidic devices are used extensively in biotechnology and health industries for the manipulation and analysis of small quantities of fluid samples. Various devices have been proposed for use as valves and pumps, such as described in U.S. Pat. No. 6,146,103 to Lee et al issued Nov. 14, 2000, and U.S. Pat. No. 6,056,269 to Johnson et al issued May 2, 2000. The Lee et al device provides a valve for a microfluidic device, but the design described requires a somewhat complicated structure and as shown does not show how to prevent leakage. The Johnson et al device provides a device that blocks flow by movement of a plate parallel to fluid flow. Again this device has a somewhat complicated design. This invention is directed to an improved microfluidic control device that is easy to make and use, while ensuring a tight fluid seal in a microfluidic flow control structure.

SUMMARY OF THE INVENTION

There is therefore provided according to an aspect of the invention, a method of controlling fluid flow in a channel in a microfluidic flow control device. The method may comprise introducing fluid to the channel, with the fluid flowing in a flow direction and controllably deforming material defining the channel in a direction perpendicular to the flow direction to control fluid flow in the channel. The channel is preferably formed between a first plate and a second plate and controllably deforming material defining the channel comprises deforming at least one of the first and second plates. Preferably, material defining the channel extends continuously between an inlet port and an outlet port. Controllably deforming material defining the channel preferably comprises deforming the first plate into contact with a seat formed in the second plate to close the channel. The seat may be formed by a ridge having a smoothly changing profile in section across the channel.

A pumping action may be obtained by deforming the channel at successively at spaced apart positions along the channel to drive fluid along the channel. Alternatively, a pumping action may be obtained by closing the channel at a first position by deformation of the channel, compressing the channel in a compression region adjacent the first position to drive fluid in the channel along the channel away from the first position past a second position in the channel, closing the channel at the second position by deformation of the channel to prevent fluid flow past the second position into the compression region while the compression region is decompressed; and opening the channel at the first position to allow fluid to flow into the compression region while the compression region is decompressed.

A filtering action may be obtained, for particular use when the fluid contains particles, by controllably deforming material defining the channel to restrict the channel sufficiently to selectively prevent and allow the particles to move with the fluid in the channel.

According to a further aspect of the invention, there is provided a microvalve, comprising a first plate and a second plate placed together to form a channel between them, valve seat formed in the first plate on one side of the channel, the valve seat having a valve seat profile, and the second plate being deformable opposite to the valve seat into a deformation profile that matches the valve seat profile. Preferably, the valve is actuated by an actuator positionable against one of the first plate and the second plate for deforming the one of the first plate and the second plate. The valve seat is preferably formed by a ridge extending transversely across the channel. Preferably, the ridge drops in height to be flush with the channel at the center of the channel.

According to a further aspect of the invention, the channel may be formed partly in a top plate and partly in a bottom plate. Preferably, the bottom plate contains a weir. Controllably deforming material defining the channel may comprise deforming material of the top plate across from the weir.

According to a further aspect of the invention, there is provided a microvalve, comprising a first plate and a second plate placed together to form a channel between them, a valve seat formed in the first plate on one side of the channel, the valve seat having a valve seat profile, the valve seat profile being U-shaped, deformable material in the second plate opposite to the valve seat, the deformable material being deformable into a deformation profile that matches the valve seat profile; and an actuator positionable against one of the first plate and the second plate for deforming the one of the first plate and the second plate. The microvalve may include a bypass channel is formed in one or both of the first plate and the second plate on at least one side, and preferably both sides, of the valve seat.

According to a further aspect of the invention, there is provided a microfluidic trapping device, comprising a body having a channel extending through the body, the channel having a first end and a second end, a first gate at the first end of the channel, a first gate actuator operably connected to the first gate, a second gate at the second end of the channel and a second gate actuator operably connected to the second gate. Preferably, the body comprises a first plate and a second plate, with the channel being formed between the first plate and the second plate, and the first gate is actuated by moving the first plate towards and away from the second plate. The second gate may be actuated by moving the first plate towards and away from the second plate.

According to a further aspect of the invention, there is provided a method of controlling fluid flow in a channel in a microfluidic flow control device, the method comprising the steps of merging a first fluid stream and a second fluid stream in the channel; and forcing fluid in the first fluid stream into the second fluid stream by repeatedly blocking and unblocking the first fluid stream. There may also be provided the step of merging a third fluid stream with the first fluid stream and the second fluid stream, the first fluid stream being located between the third fluid stream and the second fluid stream; and forcing fluid in the first fluid stream into the third fluid stream by repeatedly blocking and unblocking the first fluid stream. Preferably, blocking and unblocking the first fluid stream comprises the step of deforming material defining the channel to close a portion of the channel. Preferably, the first fluid stream has a width and the portion of the channel extends widthwise beyond the width of the first fluid stream.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which:

FIGS. 6A and 6B are views of different manners of ramping the surface of the channel up to a weir in a valve structure according to the invention;

FIG. 10 is a top view of a basic chip layout in a pump configuration, showing the inlet and outlet valves, with a compression zone in between.

DETAILED DESCRIPTION OF PREFERRED EMBODIMENTS

Figure 1:
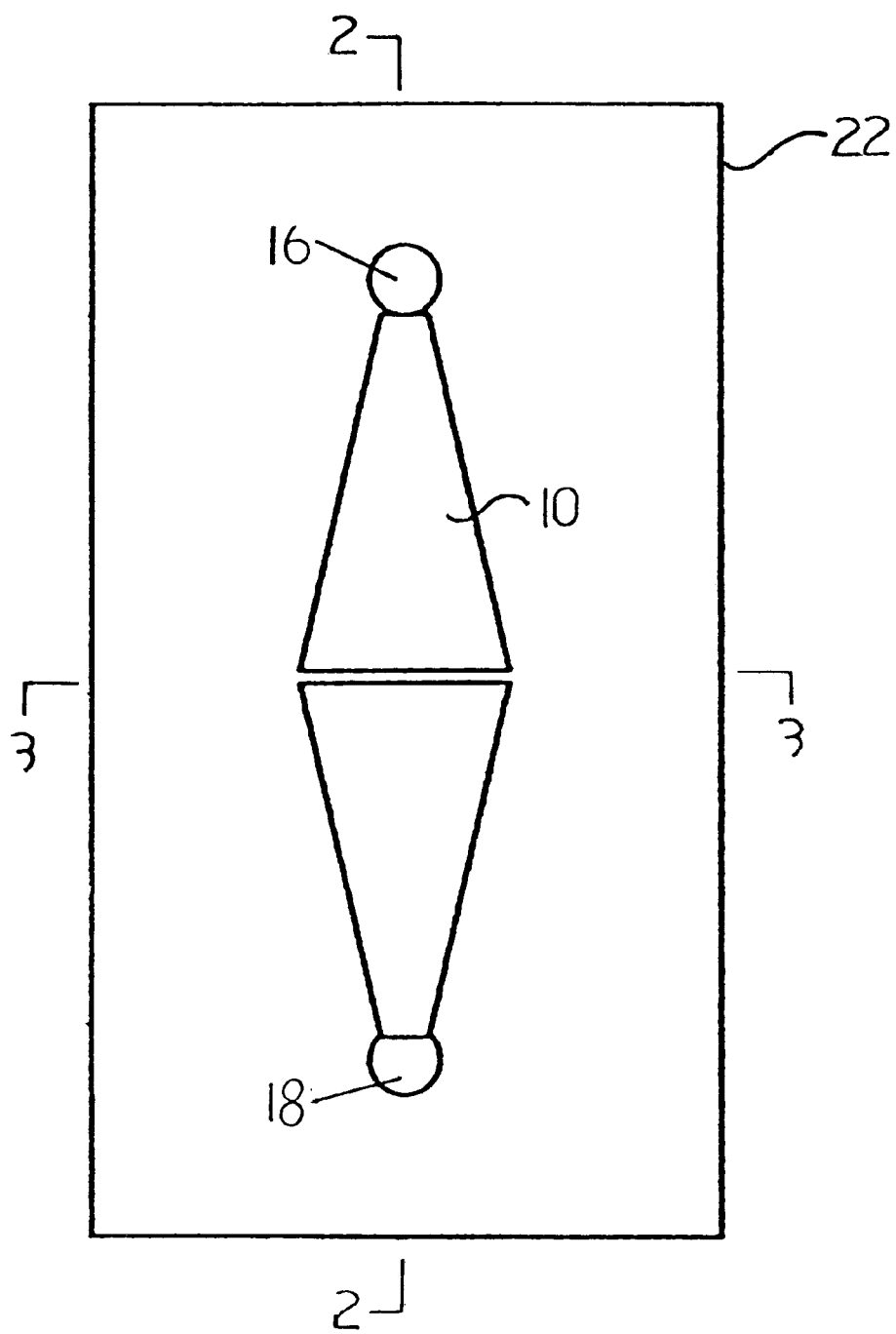
FIG. 1 shows a basic chip layout, top plan view, with inlet and outlet ports, and a weir which prevents flow through the channel when external pressure is applied.

In this patent document, "comprising" means "including". In addition, a reference to an element by the indefinite article "a" does not exclude the possibility that more than one of the element is present.

Referring to FIGS. 1–4, a channel 10, formed between two plates 12, 14, for example by etching a groove in one or both plates 12, 14, in conventional manner, extends between an inlet 16 and an outlet 18 of a microchip 22. The inlet 16 and outlet 18 may be made by conventional methods such as etching and drilling. A valve seat is formed by a weir 20 protruding from plate 12 on one side of the channel. The plates 12, 14 are bonded together in conventional manner, and the groove allows a small gap between the plates 12, 14 to form the channel 10 and allow fluids to flow between the inlet 16 and outlet 18. The microchip 22 may have multiple channels, ports and chambers, with the valve structures describe here controlling fluid flow between them.

Figure 2:
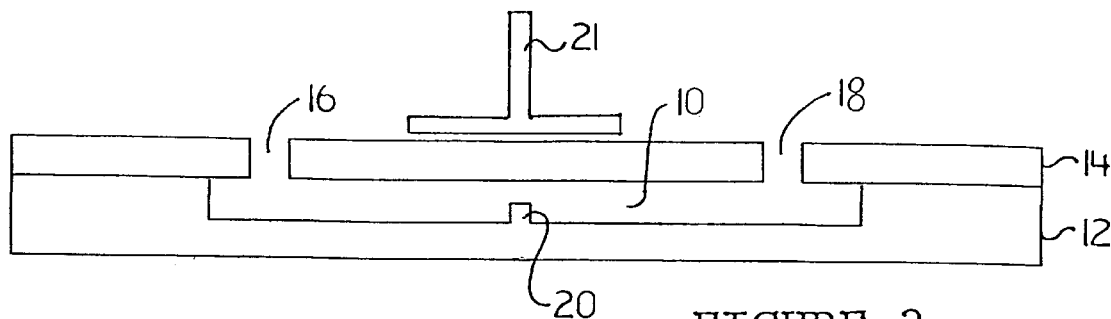
FIG. 2 is a section along the channel along the line 2—2 in FIG. 1.
Figure 3:
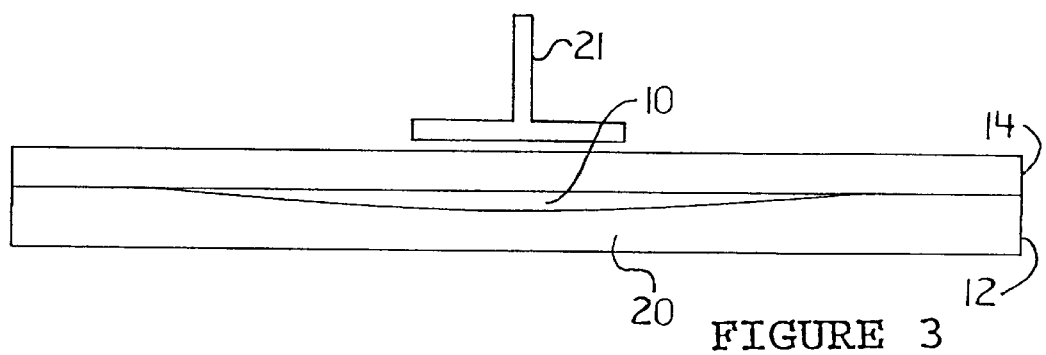
FIG. 3 is a section across the channel along the line 3—3 in FIG. 1, with valve open.
Figure 4:
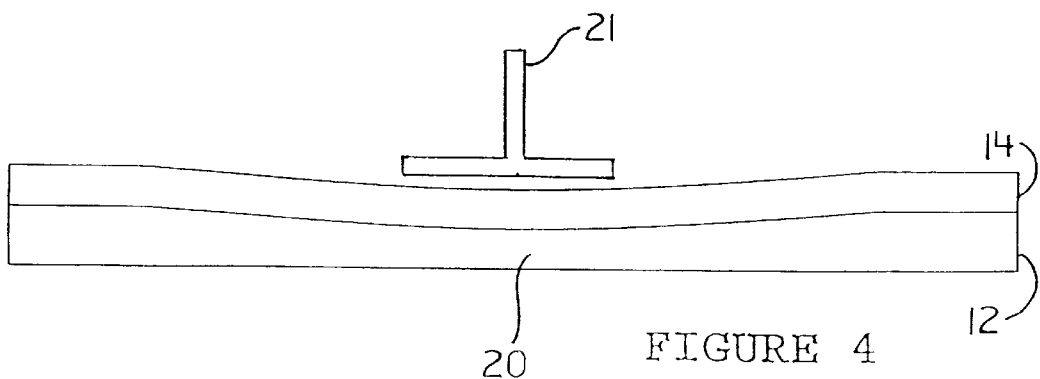
FIG. 4 is a section across the channel along the line 3—3 in FIG. 1, with valve closed.
Figure 5:
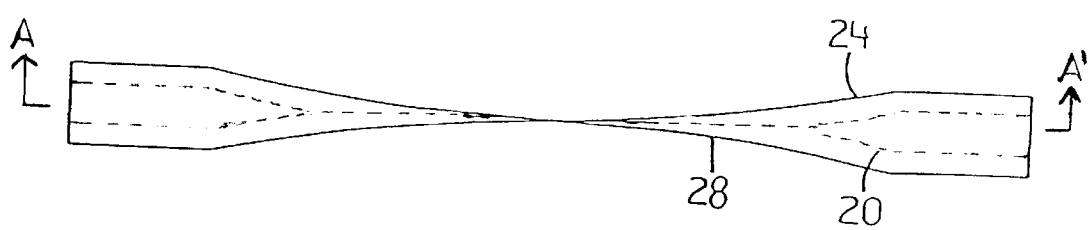
FIG. 5 shows a weir top view, with mask outline (solid), etch undercut (dashed line) and glass.
Figure 6:
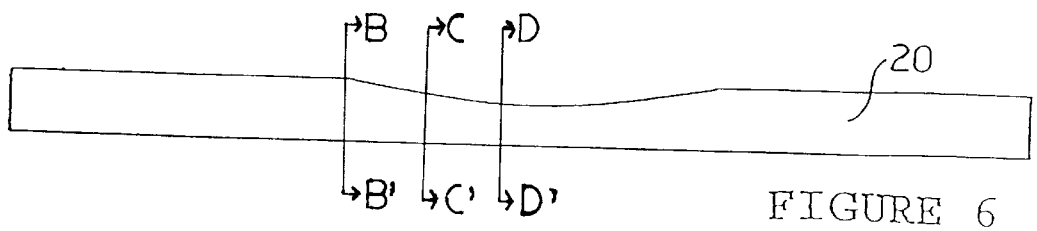
FIG. 6 is a section along the line A–A' in FIG. 5.
Figure 6:
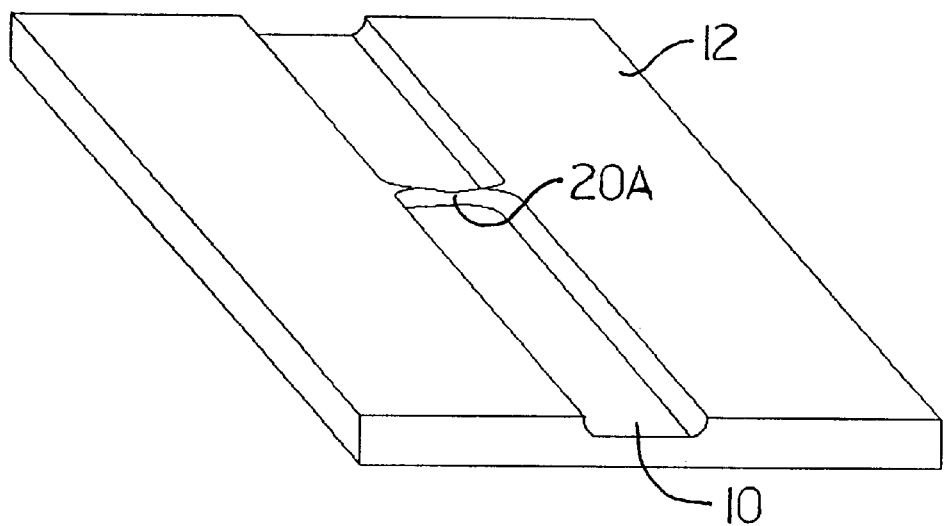
Figure 6:
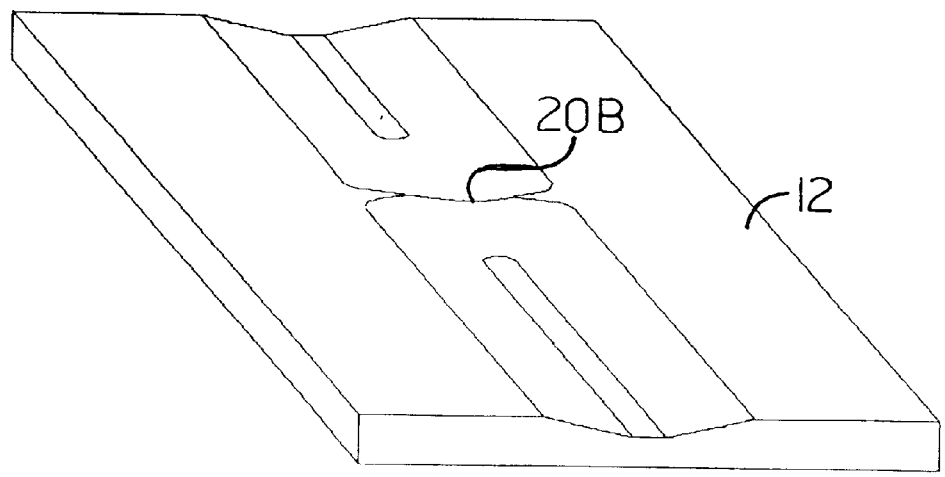
Figure 7:
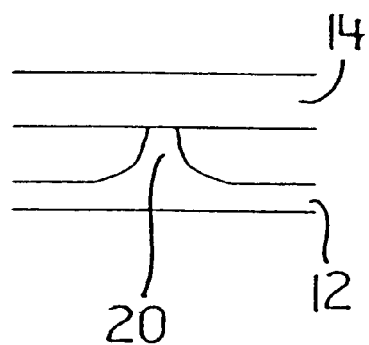
FIGS. 7, 8 and 9 are cross-sections of the weir along the lines B–B', C–C' and D–D' respectively in FIG. 6.
Figure 8:
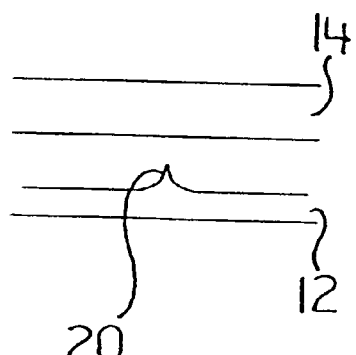

As shown particularly in FIG. 2, the material of the top plate 14 at the location of the valve structure and extending on either side of the weir 20, as for example to the ports 16, 18 is made sufficiently thin to be deformable into contact with the weir 20. The weir 20, together with the material of the opposing plate adjacent the weir 20 and extending a distance on either side of the weir to allow for bending without fracture of the plate 14, is described herein as a valve structure. As shown in FIGS. 3 and 4, the profile of the weir 20 matches the deformation profile of the top plate 14 at the location of the valve structure when the plate 14 is acted on by a force applicator 21. Deformation the cover plate 14 can open or close the channel and thus have a valve action. The force required to activate the valve structure is a function of the thickness of the top plate 14 and the unsupported width of the channel at the weir 20. The direction of movement of the plate 14 is perpendicular to the fluid flow direction in the channel 10.

Figure 9:
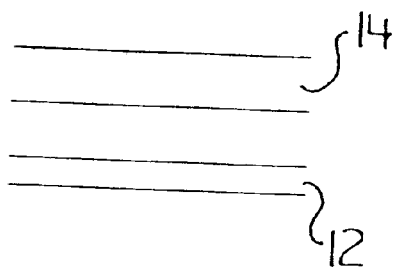

Referring to FIGS. 5–9, leakage through the valve structure is minimized by matching the profile of the weir 20 to the deformed shape of the top plate 14 when the closing force is applied. If the material of the bottom plate 12 is removed to form the weir 20 using isotropic etching techniques, the matching deformation profile can be achieved by giving an etch mask 24 a gradual taper 28 which, after etching, will produce a weir 20 having the form of a knife-edged ridge. As shown in FIGS. 6–9, the height of the weir 20 diminishes towards the center of the channel 10 until it is flush with the channel defining material of the bottom plate 12 (FIG. 9). The shape of the taper on the mask 24 can be chosen to give the desired height profile of the weir 20. The sharpness of the knife-edge of the weir 20 will be a function of the etch isotropy. As shown in FIG. 6A a weir 20A has a steep slope between channel bottom and the face of the weir. In FIG. 6B, an alternative design is shown in which a weir 20B has a gradual transition between the bottom of the channel 10 and the top of the weir 20B.

Various force applicators 21 and equivalent methods may be used to apply the force to open and close the valve and all other microfluid structures described in this patent document. For example, pressurization of the channel 10 could push the plates 12, 14 apart and open the valve. Any other sort of force external to the plate surfaces applied by a representative force applicator 21 could also be used. Some examples are pneumatic, electromagnetic, piezo-electric, or mechanical. Another example is thermal control of the channel width, either heating the surface of one or both of the plates, or by heating one plate and not the other. The term "force applicator" covers any of these techniques and their equivalents.

The plates may be made of any suitable material, such as glass, silicon dioxide, or plastic, depending on the desired application. The applications for these devices typically have channel heights from 1 µm to 100 µm. As shown in FIG. 1, to accommodate bending of the top plate 14, the channel has a breadth that far exceeds its height, in ratios greater than 10 to 1. In an example of a glass plate used as the top plate 14, the ridge and channel were 7 mm wide at the valve structure, the glass was 0.5 mm thick with 5 µm movement transverse to the channel under a differential pressure of 100 psi.

The valve structure may be used to control fluid flow. When fluid is introduced into the channel, the fluid flow in the channel may be controlled by controllably deforming material defining the channel. A complete block may be achieved when the material of the top plate 14 is urged into direct contact with the weir 20 across the channel width. Partial blocking, or restricted flow, may be achieved with a lower degree of deformation.

Figure 10:
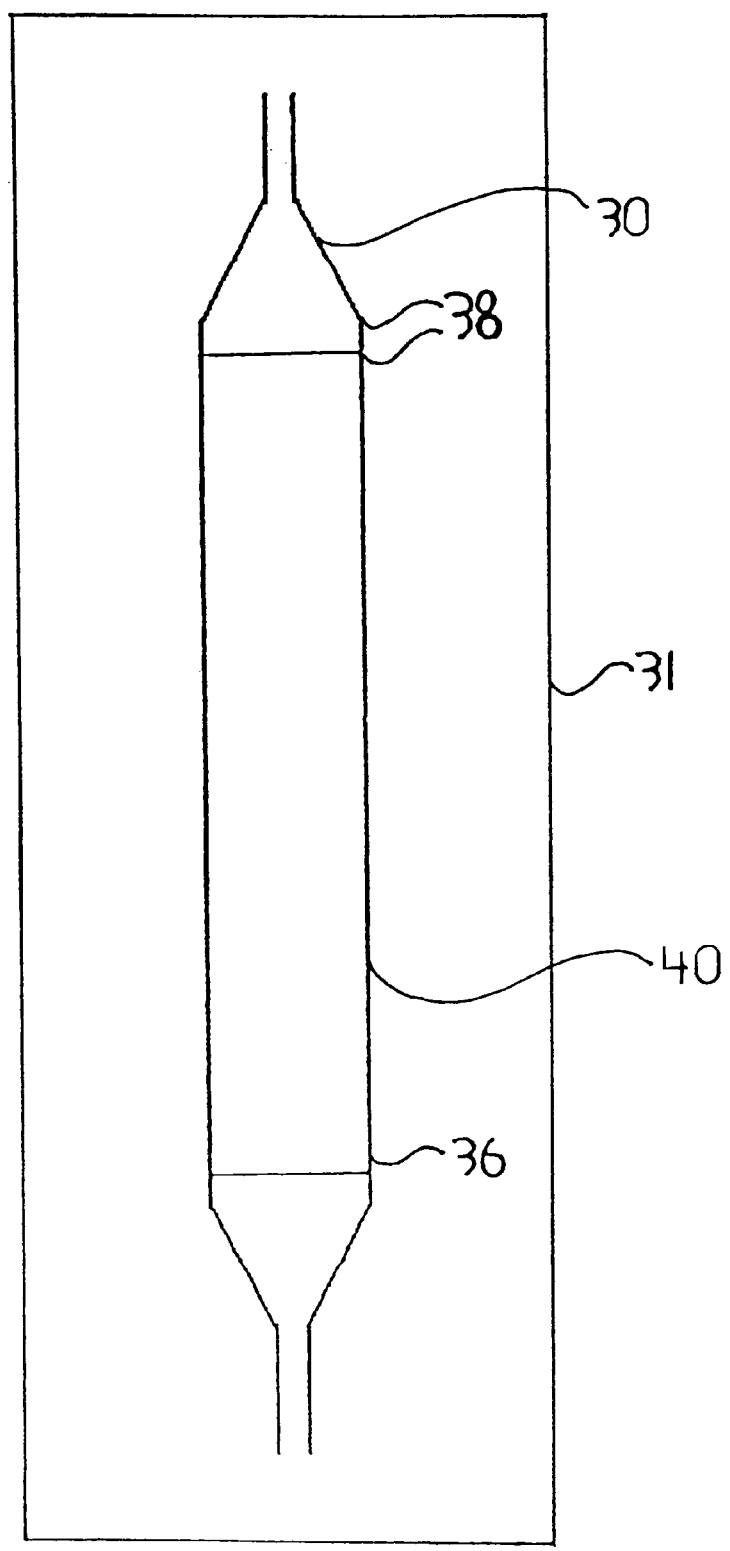
Figure 11:
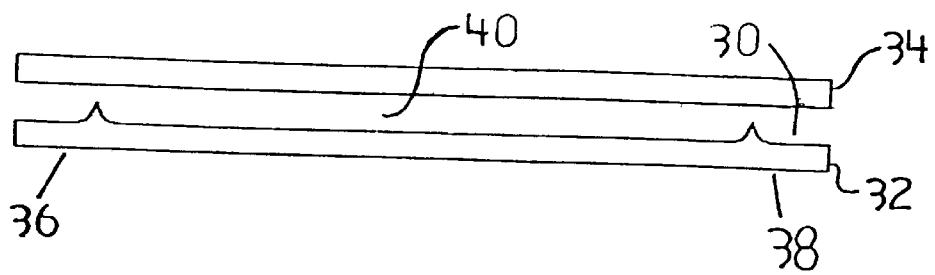
FIG. 11 is a cross-sectional view of the micro-machined pump of FIG. 10.

Deformation of the material defining the channel 10 may also be used to pump fluid. Referring to FIGS. 10 and 11, a basic pump 31 is made from glass plates 32, 34 bonded together to form a channel 30 out of an etched depression on the surface of plate 32. The top plate 34 is made sufficiently thin to be deformable. External force on the plate 34 can cause deformation of the upper channel surfaces. Optionally, the bottom plate 32 may also or may only be made deformable. A structure for pumping fluid uses two independently operating valves 36, 38, separated by a volume or chamber 40 from which fluid can be forced by compression of the plates 32, 34. Pumping can be achieved by having the inlet closed and outlet open while compressing the central region, and having the inlet open and outlet closed during de-compression.

Figure 12:
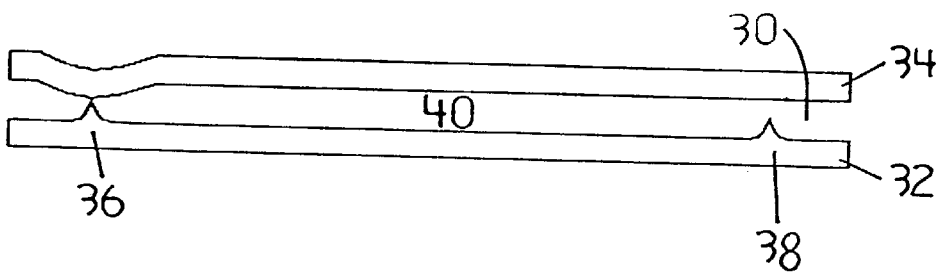
FIGS. 12A, 12B, 12C and 12D show the four steps required for operation of the pump of FIG. 10.
Figure 12:
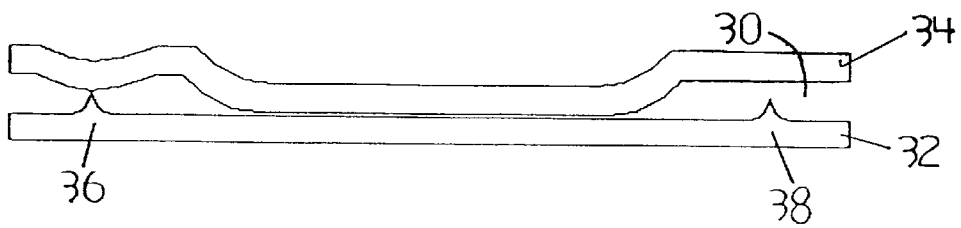
Figure 12:
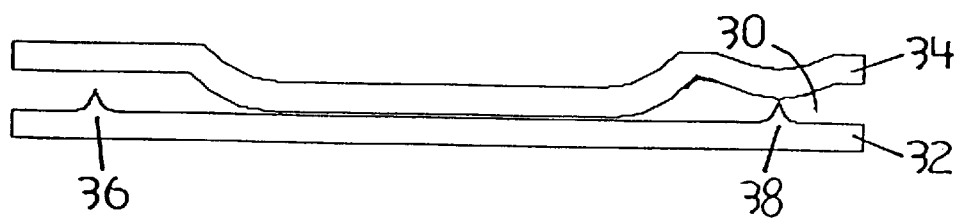
Figure 12:
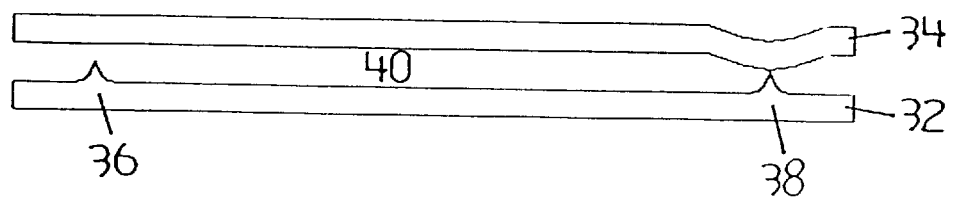

Referring to FIG. 12A, the valve 36 is first closed preferably by deformation of the plate 34 at the valve location. Valve 38 is open. In FIG. 12B, the plate 34 is deformed over the compression chamber 40 to close the chamber 40 and force fluid out of the chamber 40 past the open valve 38. In FIG. 12C, valve 38 is closed and valve 36 is opened. In FIG. 12D, the compression zone is decompressed, enlarging chamber 40 and allowing fluid to flow into the chamber 40. Repetition of these steps causes fluid to be pumped through the channel 30. In another embodiment, the location of the deformation region may be moved along the channel 30 to pump fluid through the channel 30.

The valve structure of FIG. 1 may also be used as a variable orifice inside a channel, for filtering particles from a solution flowing through the channel. When the weir 20 has a surface profile matching that of the deformed top plate 14, a very small gap can be maintained uniformly across the entire channel width. The gap size may be chosen to filter sizes ranging from the molecular scale up to 30–50 µm. Concentration of the particles occurs after flowing a large amount of fluid past the filter, and the concentrated particles could then be released as desired into the fluidic channel. Some materials of particular interest would be DNA, proteins, and biological cells.

Figure 13:
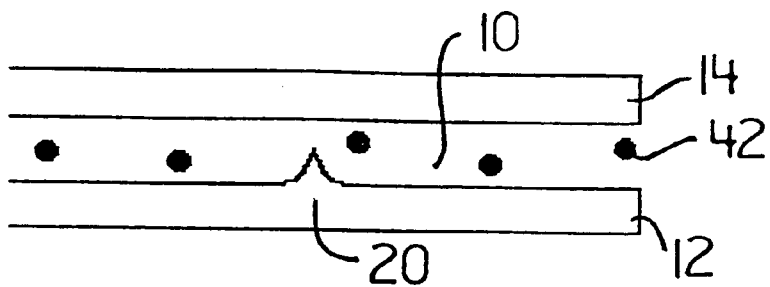
FIG. 13 shows a filtering device in section, with open weir and unhindered flow.
Figure 14:
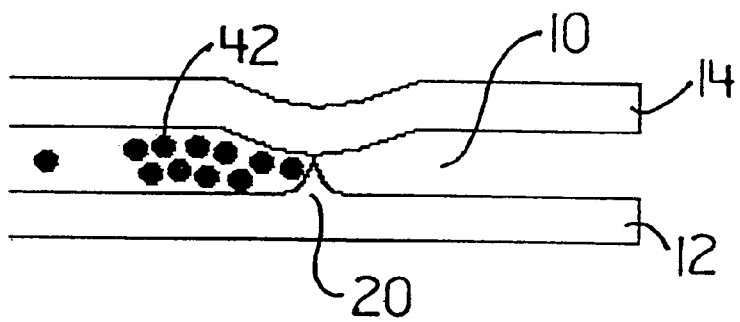
FIG. 14 shows the device of FIG. 13 with closed weir, particles are filtered from the flowing liquid.
Figure 15:
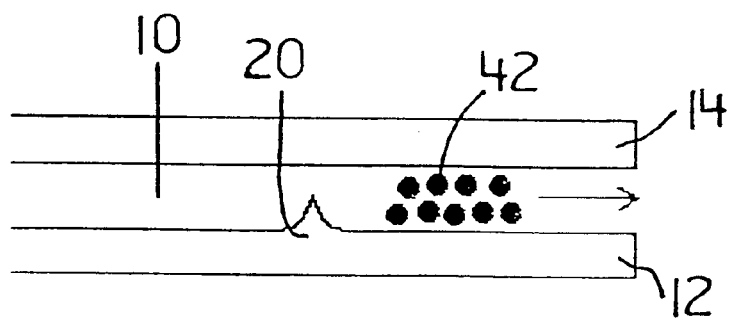
FIG. 15 shows the device of FIG. 13 showing a flow of concentrated particles after opening the weir.

As shown in FIG. 13, the valve is open allowing unhindered flow of fluid carrying particles 42 through the channel 10. In FIG. 14, the channel has been selectively restricted by partially closing the valve to trap the particles 42 behind the weir 20. In FIG. 15, concentrated particles 42 trapped behind the weir 20 are released to flow through the channel 10.

Figure 16:
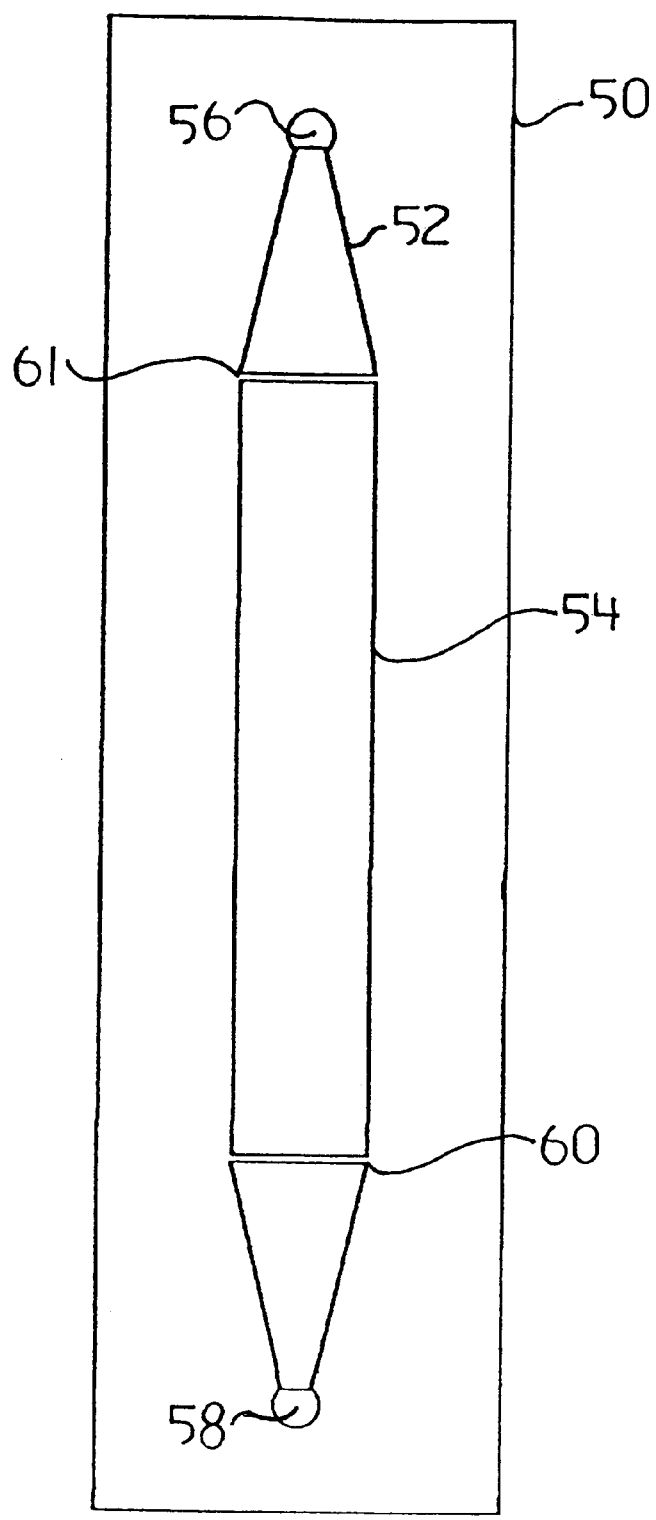
FIG. 16 shows a basic chip layout of a trapping device, with inlet and outlet ports, and a weir at each end of the zone where beads are trapped.

Referring to FIG. 16, there is shown a structure 50 for control of bead loading and unloading in a micro-channel. The channel structure 50 allows movement of beads into a channel 52 having an inlet 56 and outlet 58, trapping of the beads in a specific zone 54 defined between two weirs 60, 61, and then opening of the channel 52 for flushing the beads.

Figure 17:
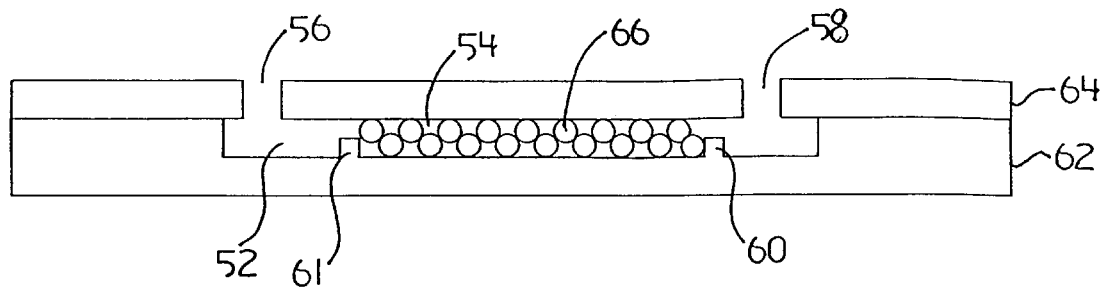
FIG. 17 shows a side view detail of the weir in the device of FIG. 16, beads trapped between weirs.
Figure 18:
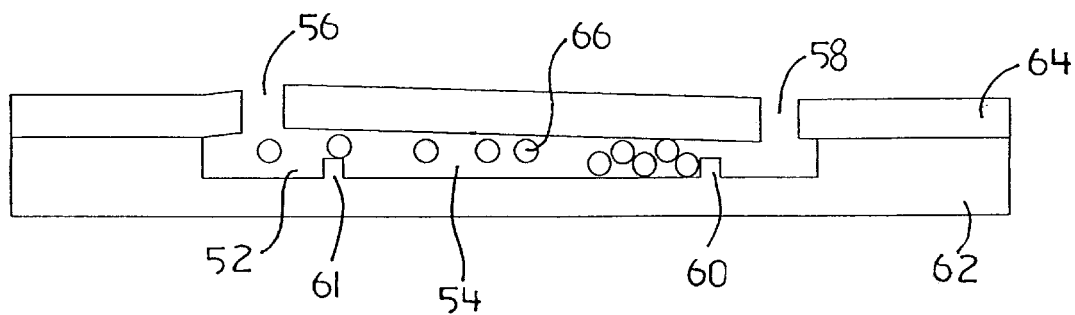
FIG. 18 shows a side view detail of the weir in the device of FIG. 16, with the first weir opened to allow beads to load into the chamber.

Referring to FIG. 17, the channel 52 is made in a plate 62, for example made from glass, by etching a groove in the surface of the plate 62 using conventional methods. The inlet 56 and outlet 58 are formed in a top plate 64 using conventional methods. Beads 66, which may for example have chemically active surface coatings, are shown trapped in the zone 54, with both valve structures defined by the weirs 60, 61 sufficiently restricted that the beads 66 cannot exit the trapping zone 54. Performing multiple analyses in the same channel with beads with chemically active surface coatings may require flushing out of used beads and bringing in new ones. Loading of the trapping zone 54 may be accomplished as shown in FIG. 18 by opening weir 61 and closing weir 60 sufficiently to trap beads 66 carried by fluid flowing within the channel 50. Unloading of the trapping zone 54 is accomplished by opening the weir 60 and allowing the fluid and beads 66 to flow out of the trapping zone 54. Preferably, the gap between the weirs 60 and 61 and the undeformed surface of the plate 64 at the weirs 60, 61 has a height close to the bead diameter so that under a small deformation the plate 64 opens or closes the channel 50. The force required to change the opening size is determined by the thickness of the plate 64 and the unsupported width of the channel 50 at the weirs 60, 61.

Figure 19:
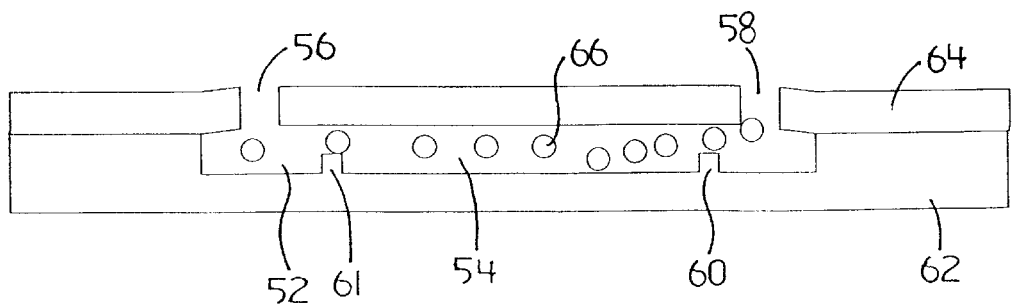
FIG. 19 shows a side view detail of the weir in the device of FIG. 16, both weirs open.
Figure 20:
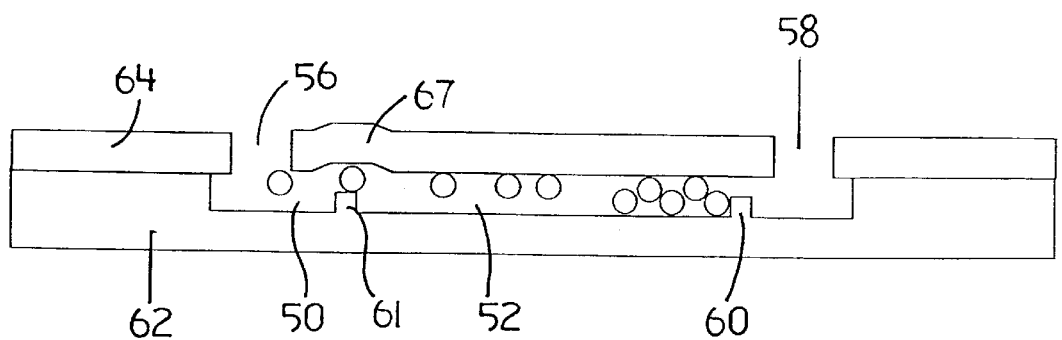
FIG. 20 shows actuation forces for the device of FIG. 16.

Actuation of the valve structures defined by the weirs 60, 61 may be controlled by pessurization of the channel 50 to cause deformation of the plate 64 at both weirs 60, 61. The inlet weir 61 may be made to open at a low pressure by making the channel 50 wider at the inlet weir 61 as shown in FIG. 18. Higher pressure opens both the inlet weir 61 and outlet weir 60 as shown in FIG. 19. Any mechanical or pneumatic force can be applied directly to the plate 64 above or below each of the weirs 60, 61 as illustrated at 67 in FIG. 20.

Figure 21:
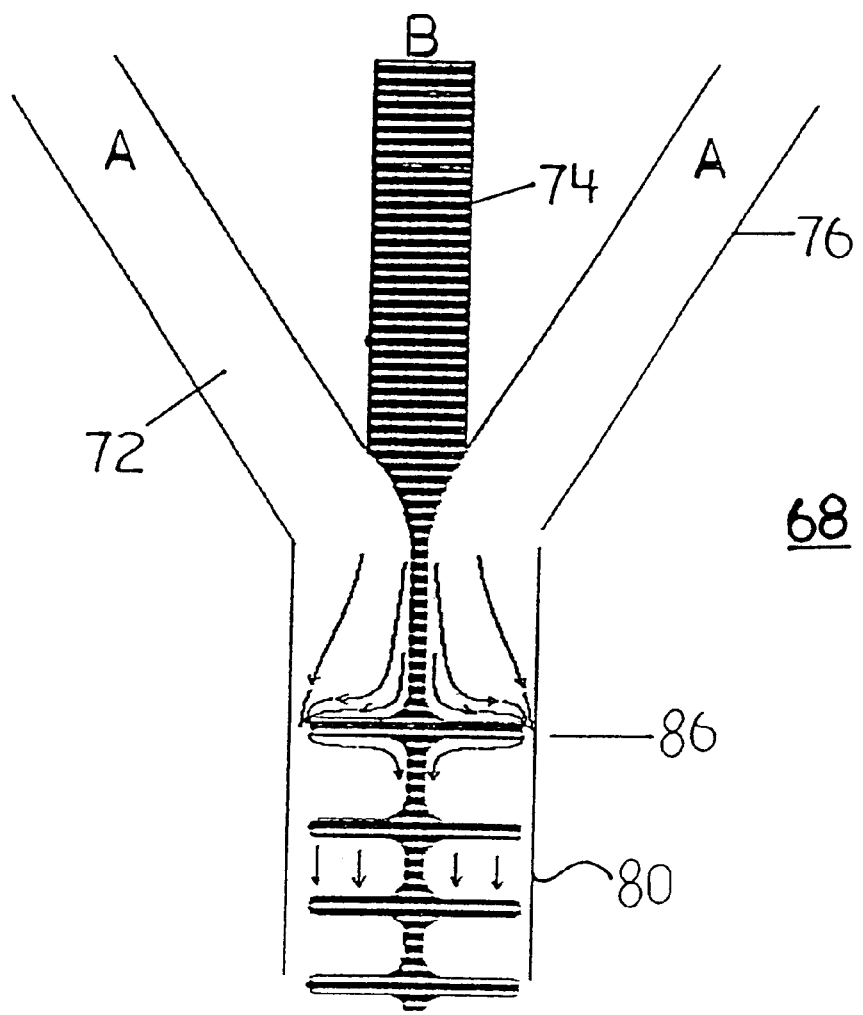
FIG. 21 is a top plan view of a mixer device with flow pattern for 2 fluids (labeled A and B) through a mixing weir.
Figure 22:
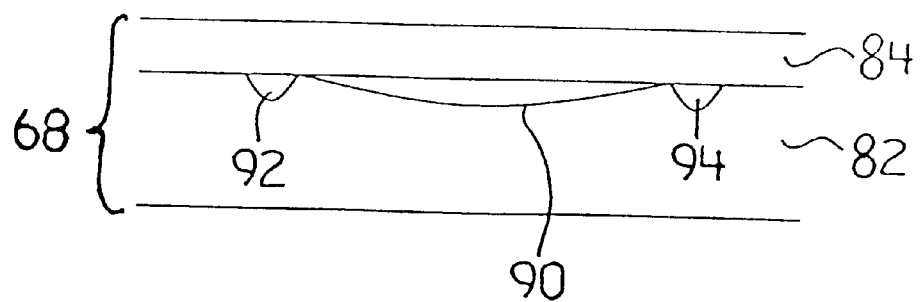
FIGS. 22A and 22B are details of the device of FIG. 21, showing valve cross section, open and closed respectively.
Figure 22:
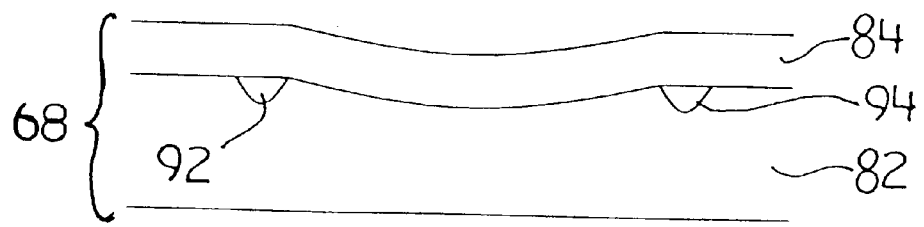

The valve structure of the invention may also be used to enhance the mixing of two fluids in a micro-fabricated channel. As shown in FIGS. 21, 22A and 22B, a micro-chip 68 has grooves etched in a bottom plate 82 that is covered by a top plate 84 to form three channels 72, 74, 76 through which three streams flow and merge to form a mixing stream in a single channel 80. A valve structure 86 is formed in the single channel 80 as shown in FIGS. 22A and 22B. At the valve structure 86, the plate 82 is etched so that a weir 90 has a central section that matches the deformation profile of the plate 84 opposite the weir 90, and side channels 92, 94 that allow flow of fluid even when the central section of the weir 90 is closed. Mixing of fluid is enhanced by merging the streams in the channels 72, 74 and 76, then forcing fluid in the central fluid stream into streams on either side of the central fluid stream by repeatedly blocking and unblocking the central fluid stream using the valve structure 86.

When two different flowing fluids, one for example in channels 72, 76 and the other in channel 74, are merged into a single channel 80, the characteristics of laminar flow mean that the only mixing occurs at the interface between the two fluids. Increasing the interface length speeds the mixing of the two fluids. In the design shown in FIGS. 21, 22A and 22B, the interface between the two fluids is extended by opening and closing the valve structure 86. The valve structure 86 forces the central fluid to flow to the channel edge when the valve is closed, but to pass through the central area when open.

Figure 23:
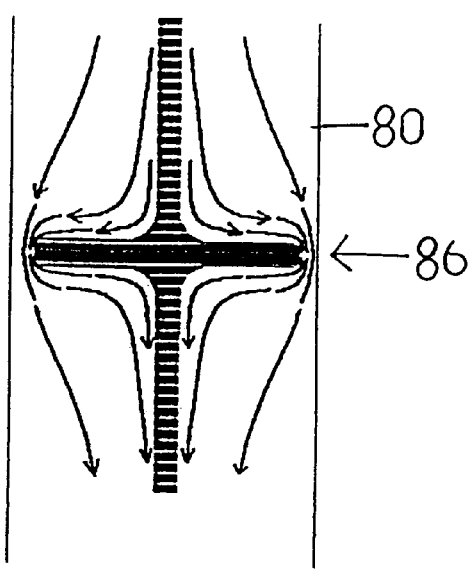
FIG. 23 is a top view of the device of FIG. 21, steady state flow with valve closed.
Figure 24:
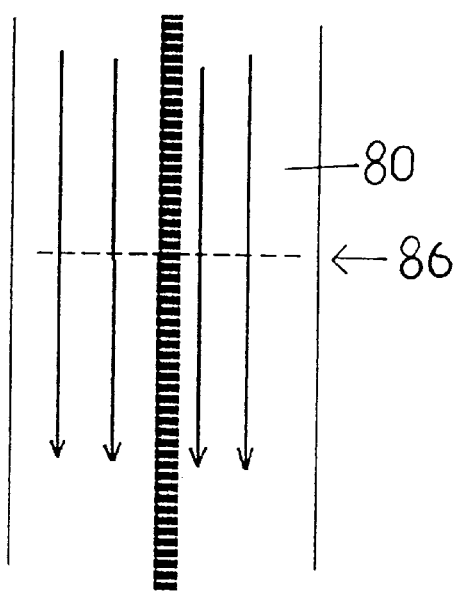
FIG. 24 is a top view of the device of FIG. 21, steady state flow with valve open.
Figure 25:
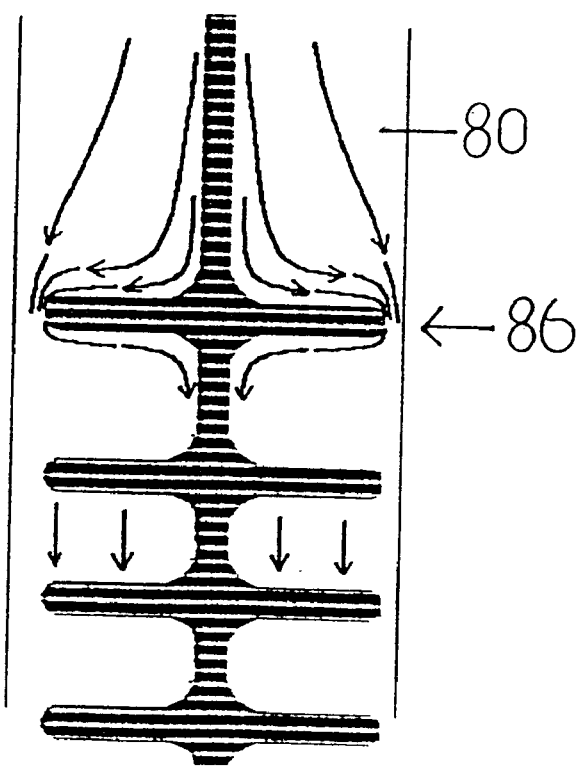
FIG. 25 is a top view of the device of FIG. 21, valve opening and closing to extend the fluid interface and enhance fluid mixing.

Opening and closing the valve structure 86 causes pulses of fluid to flow as illustrated in FIGS. 23, 24 and 25. In FIG.

23, the valve structure 86 is closed and the fluids flowing in the channel 80 are spread out across the central portion of the weir 90 and diverted into the channels 92, 94. When the valve structure 86 is opened, the fluid is free to flow across the entire channel as shown in FIG. 24. By opening and closing the valve structure 86, pulses of backed up fluid flow down the channel 80 as illustrated in FIG. 25, thus increasing the contact area between the fluids and enhancing mixing.

Figure 26:
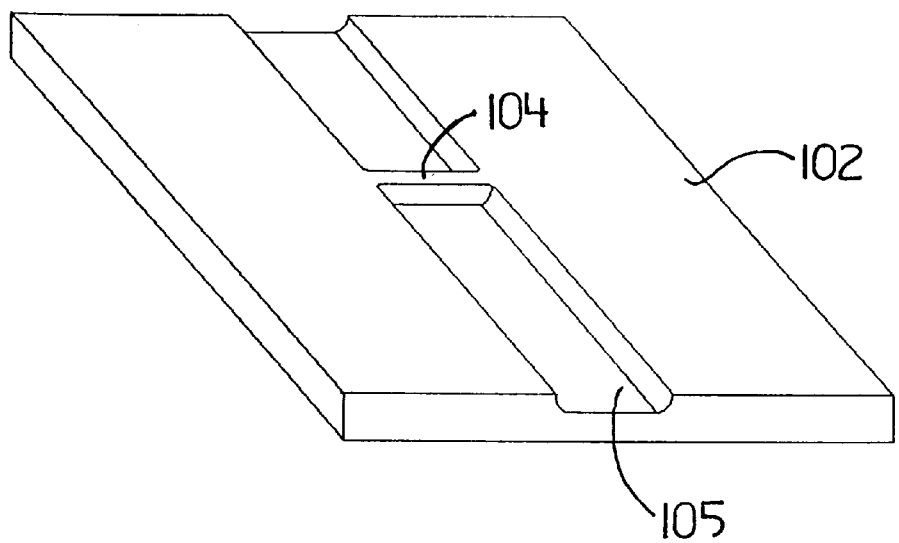
FIGS. 26A and 26B are respectively perspective views of a top and bottom plate of a further embodiment of a valve structure according to the invention.
Figure 26:
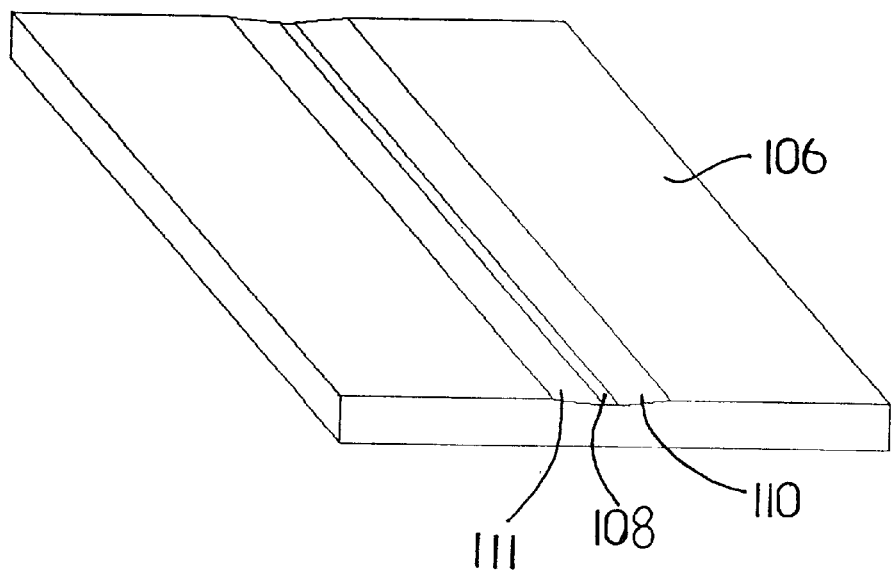

Another way to make a weir for a valve structure is shown in FIGS. 26A and 26B. A channel plate 102 with a full channel-height weir 104 and channel 105 is bonded to a cover plate 106 (shown upside down) with a groove 108 having shallow, linearly ramped, sidewalls 110, 111. When bonded together with the groove 108 and channel 105 together form a channel through the micro-structure, with a small gap above the weir 104 that may be opened or closed with external force. Unlike the weir 20 with the curved contact surface, the shape of the opening would be three straight-line segments.

The main advantage of the design of FIGS. 26A and 26B is that the valve seat contact area is defined by the width of the un-etched weir 104 in the channel plate 102. With the design of FIGS. 1–9, the contact is only along the line defining the top of the weir 20, which may be non-ideal due to either manufacturing flaws or damage during operation. The larger contact area of the embodiment of FIGS. 26A and 26B provides a more reliable valve-seat surface quality.

Immaterial modifications may be made to the invention described here without departing from the essence of the invention.

What is claimed is:

1. A method of controlling fluid flow in a channel in a microfluidic flow control device, the channel being formed between a first plate and a second plate, the second plate having a ridge with a smoothly changing profile in section across the channel; the method comprising the steps of:

introducing fluid to the channel, with the fluid flowing in a flow direction; and controllably deforming one of the first plate and the second plate in a direction perpendicular to the flow direction to make the first plate contact the ridge and control fluid flow in the channel.

2. The method of claim 1 in which controllably deforming the channel comprises deforming the channel at successively at spaced apart positions along the channel to drive fluid along the channel.

3. The method of claim 1 further comprising:

closing the channel at a first position by deformation of the channel;

compressing the channel in a compression region adjacent the first position to drive fluid in the channel along the channel away from the first position past a second position in the channel;

closing the channel at the second position by deformation of the channel to prevent fluid flow past the second position into the compression region while the compression region is decompressed; and opening the channel at the first position to allow fluid to flow into the compression region while the compression region is decompressed.

4. The method of claim 1 in which the fluid contains particles and controllably deforming material defining the channel comprises the step of restricting the channel sufficiently to selectively prevent and allow the particles to move with the fluid in the channel.

5. The method of claim 1 in which the material defining the channel extends continuously between an inlet port and an outlet port.

6. The method of claim 1 in which the channel is formed partly in a top plate and partly in a bottom plate.

7. The method of claim 6 in which the bottom plate contains a weir and controllably deforming material defining the channel comprises deforming material of the top plate across from the weir.

8. A microvalve, comprising:

a first plate and a second plate placed together to form a channel between them;

an actuator positionable against one of the first plate and the second plate for deforming the one of the first plate and the second plate;

a valve seat formed in the first plate on one side of the channel, the valve seat having a valve seat profile, the valve seat being formed by a ridge extending transversely across the channel; and the second plate being deformable opposite to the valve seat into a deformation profile that matches the valve seat profile.

9. The microvalve of claim 8 in which the ridge is flat topped in section and a groove in the second plate is located opposite the valve seat to form a gap between the ridge and the second plate.

10. The microvalve of claim 9 in which the groove is formed of linearly ramped sidewalls.

11. The microvalve of claim 8 in which ridge drops in height to be flush with the channel at the center of the channel.

12. A microvalve, comprising:

a first plate and a second plate placed together to form a channel between them;

a valve seat formed in the first plate on one side of the channel, the valve seat having a valve seat profile, the valve seat profile being U-shaped;

deformable material in the second plate opposite to the valve seat, the deformable material being deformable into a deformation profile that matches the valve seat profile; and an actuator positionable against one of the first plate and the second plate for deforming the one of the first plate and the second plate.

13. The microvalve of claim 12 in which a bypass channel is formed in one or both of the first plate and the second plate on at least one side of the valve seat.

14. The microvalve of claim 12 in which bypass channels are formed in one or both of the first plate and the second plate on the opposed sides of the valve seat.

* * * * *